(No Model.)

E. W. EASLEY.
CULTIVATOR.

No. 245,360. Patented Aug. 9, 1881.

Witnesses:

Inventor:
Edward W. Easley
per LaFayette Bingham
Attorney.

United States Patent Office.

EDWARD W. EASLEY, OF PETER'S LANDING, TENNESSEE.

CULTIVATOR.

SPECIFICATION forming part of Letters Patent No. 245,360, dated August 9, 1881.

Application filed March 2, 1881. (No model.)

*To all whom it may concern:*

Be it known that I, EDWARD W. EASLEY, a citizen of the United States, residing at Peter's Landing, in the county of Perry and State of Tennessee, have invented certain new and useful Improvements in Cultivators; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification, and in which—

Figure 1:
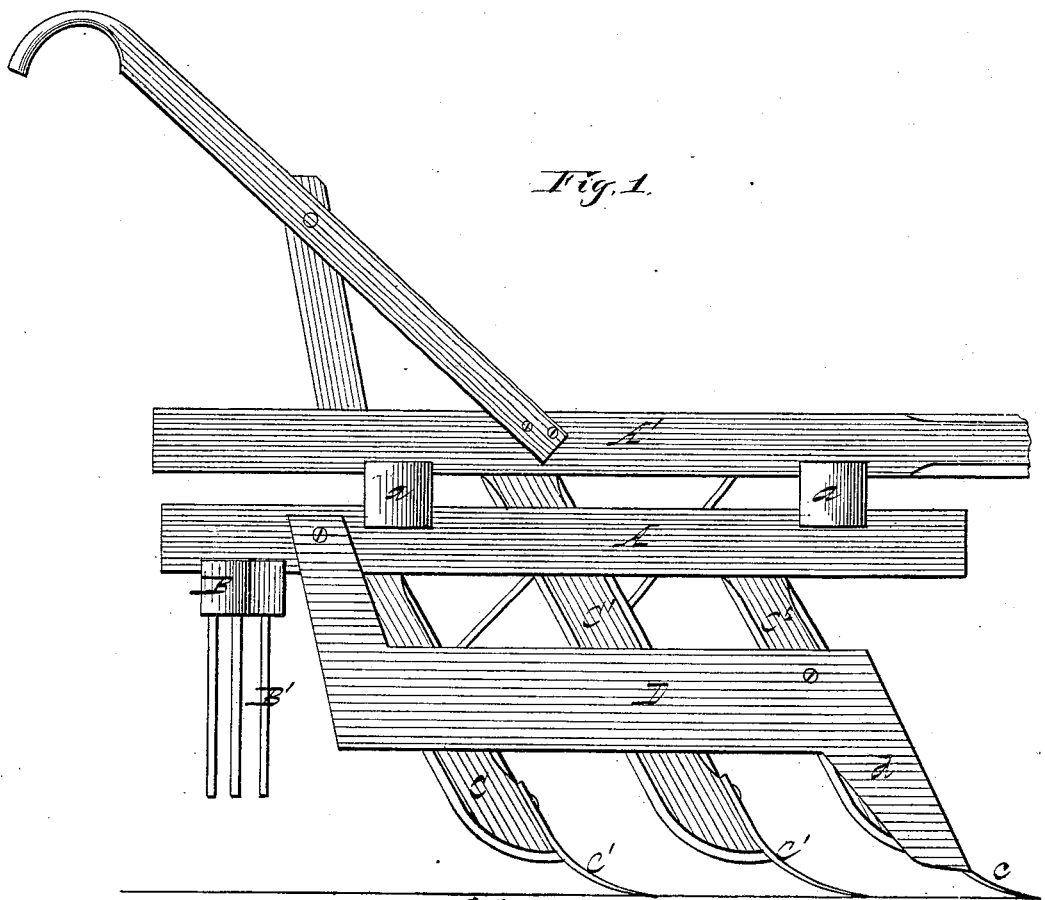
Figure 2:
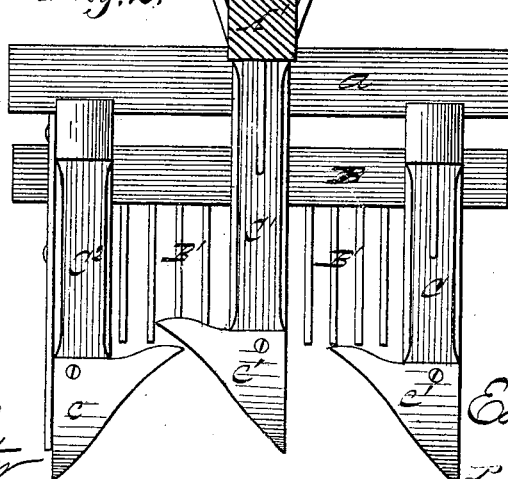

Figure 1 is a side elevation of my improved cultivator; and Fig. 2 is a transverse view, partly in section, viewing the fingers or teeth attached to the rear bar from the forward side.

This invention relates to improvements in cultivators particularly adapted for the cultivation of peanuts, cotton, corn, seed-millet, sorghum, &c., and for rebreaking or harrowing the ground; and it consists in certain details in the construction and arrangement of parts, substantially as hereinafter more fully set forth.

Referring to the accompanying drawings, A A indicate two side beams, suitably connected together by cross-bars $a$ $a$.

A' is a middle beam, secured upon the cross-bars $a$ $a$. The draft is applied to the forward end of this beam, while to its rear end, or thereabout, are attached the handles for guiding the movement of the plow or cultivator.

To the under side of the bars $a$ $a$, at their rear ends, is attached a head, B, having a series of depending fingers or teeth, B', for rebreaking or harrowing the plowed ground.

C C' $C^2$ are the shovel or plow standards, connected, one to the rear end of one of the outside beams, A, a second one, C', to the middle beam, A', a suitable distance in advance of plow-standard C, and the third one, $C^2$, to the other side beam, a suitable distance in advance of plow-standard C'. The shovel $c$ of the standard $C^2$ is adapted, in the present instance, to throw the dirt away from the plant, while the shovels $c'$ $c'$ of the other standards serve to throw the dirt toward the plants. This order of the shovels may be reversed or changed as occasion may require.

D is a fender, with its forward end fastened detachably to the forward plow or shovel standard, and having a downwardly-extending portion, $d$, to guard and permit of the taking away of the dirt deep and close to the plant, and at the same time supporting the plant until the furrow made by the front plow is filled by the next shovel or plow in the rear and at one side of the front plow or shovel. When the plants are sufficiently large to permit of cultivation without the use of the fender it can be readily removed. The order of the plows is then changed so as to cause the front plow to throw the dirt upon or around the plants, they being detachably connected to their standards.

Having thus fully described my invention, I claim and desire to secure by Letters Patent—

In a cultivator, the combination, with the beams A A' A, having the shovel-standards C C' $C^2$ arranged in advance of each other, of the fender D, with its forward end connected to the front standard, and having a downward extension, $d$, arranged alongside of the plow $c$, substantially as and for the purpose set forth.

In testimony whereof I affix my signature in presence of two witnesses.

EDWARD WADE EASLEY.

Witnesses:
R. MILLER,
HENRY MORRIS.